United States Patent
Fang et al.

(10) Patent No.: US 11,579,285 B2
(45) Date of Patent: Feb. 14, 2023

(54) INTELLIGENT ROADSIDE UNIT

(71) Applicant: BAIDU ONLINE NETWORK TECHNOLOGY (BEIJING) CO., LTD., Beijing (CN)

(72) Inventors: Lei Fang, Beijing (CN); Haisong Wang, Beijing (CN); Xing Hu, Beijing (CN); Sheng Tao, Beijing (CN); Yifeng Shi, Beijing (CN); Huo Cao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 407 days.

(21) Appl. No.: 16/546,573

(22) Filed: Aug. 21, 2019

(65) Prior Publication Data

US 2020/0072962 A1   Mar. 5, 2020

(30) Foreign Application Priority Data

Aug. 31, 2018 (CN) .......................... 201811015653.1

(51) Int. Cl.
*G01S 13/89* (2006.01)
*G01S 13/42* (2006.01)
(Continued)

(52) U.S. Cl.
CPC ............ *G01S 13/867* (2013.01); *G01S 13/42* (2013.01); *G01S 13/865* (2013.01); *G01S 13/89* (2013.01);
(Continued)

(58) Field of Classification Search
CPC ...... G01S 13/867; G01S 13/42; G01S 13/865; G01S 13/89; G01S 13/931; H04N 5/22521; H04N 5/2252; G08G 1/095
See application file for complete search history.

(56) References Cited

U.S. PATENT DOCUMENTS 5,289,183 A * 2/1994 Hassett ................ G07B 15/063
340/928
6,466,862 B1 * 10/2002 DeKock ........... G08G 1/096783
340/901

(Continued)

FOREIGN PATENT DOCUMENTS

CN   102571443 A   7/2012
CN   107945540 A   4/2018
(Continued)

OTHER PUBLICATIONS

Office Action for Japanese Application No. 2019-158725, dated Oct. 13, 2020, 6 pages.
(Continued)

*Primary Examiner* — Peter M Bythrow
(74) *Attorney, Agent, or Firm* — Fay Sharpe LLP

(57) ABSTRACT

The present disclosure provides an intelligent roadside unit. The intelligent roadside unit includes: a radar configured to detect an obstacle within a first preset range of the intelligent roadside unit; a camera configured to capture an image of a second preset range of the intelligent roadside unit; a master processor coupled to the radar and the camera, and configured to generate a point cloud image according to information on the obstacle detected by the radar and the image detected by the camera; and a slave processor coupled to the radar and the camera, and configured to generate a point cloud image according to the information on the obstacle detected by the radar and the image detected by the camera, in which the slave processor checks the master processor, and when the original master processor breaks down, it is switched from the master processor to the slave processor.

9 Claims, 2 Drawing Sheets

(51) Int. Cl.
  *G01S 13/86*  (2006.01)
  *G08G 1/095*  (2006.01)
  *H04N 5/225*  (2006.01)

(52) U.S. Cl.
  CPC .......... *G08G 1/095* (2013.01); *H04N 5/2252* (2013.01); *H04N 5/22521* (2018.08)

(56) References Cited

U.S. PATENT DOCUMENTS

| | | | |
|---|---|---|---|
| 6,489,920 B1* | 12/2002 | Anders | G08G 1/04 342/52 |
| 6,580,385 B1* | 6/2003 | Winner | G01S 17/931 180/169 |
| 7,460,951 B2* | 12/2008 | Altan | G06V 10/806 701/518 |
| 7,541,943 B2* | 6/2009 | Manor | G08G 1/01 340/522 |
| 7,573,400 B2* | 8/2009 | Arnold | G01S 13/91 340/916 |
| 7,889,098 B1* | 2/2011 | Arnold | G01S 13/42 340/933 |
| 8,692,690 B2* | 4/2014 | Dalal | G01S 17/58 702/143 |
| 9,684,064 B2* | 6/2017 | Nagy | G01S 13/92 |
| 9,791,557 B1* | 10/2017 | Wyrwas | G01S 7/497 |
| 10,436,898 B2* | 10/2019 | Kurata | G01S 17/86 |
| 10,816,654 B2* | 10/2020 | Rohani | G01S 13/865 |
| 2002/0145541 A1* | 10/2002 | Matsui | G08G 1/0104 340/936 |
| 2005/0102562 A1 | 5/2005 | Shinohara et al. | |
| 2006/0101201 A1 | 5/2006 | Vageline | |
| 2008/0175438 A1* | 7/2008 | Alves | G08G 1/0175 382/104 |
| 2009/0219172 A1* | 9/2009 | Wilbrod | G01S 13/91 340/937 |
| 2010/0097262 A1* | 4/2010 | Hong | G01S 13/867 342/52 |
| 2010/0328140 A1* | 12/2010 | Hong | G01S 13/87 342/55 |
| 2011/0102237 A1* | 5/2011 | Hong | G01S 13/92 342/55 |
| 2011/0291876 A1* | 12/2011 | Hong | G01S 13/66 342/113 |
| 2012/0188115 A1* | 7/2012 | Hong | G08G 1/052 342/104 |
| 2013/0151135 A1* | 6/2013 | Aubrey | G08G 1/0116 701/117 |
| 2014/0089731 A1* | 3/2014 | Lee | G06F 11/2028 714/10 |
| 2014/0195138 A1* | 7/2014 | Stelzig | G08G 1/0116 701/119 |
| 2014/0240167 A1* | 8/2014 | Cho | G08G 1/052 342/104 |
| 2014/0307087 A1* | 10/2014 | Evanitsky | G08G 1/052 348/143 |
| 2014/0312749 A1* | 10/2014 | Paetzoldt | F16M 11/08 312/223.1 |
| 2014/0333469 A1* | 11/2014 | Nagy | G01S 13/92 342/146 |
| 2015/0360565 A1 | 12/2015 | Goto et al. | |
| 2017/0090015 A1* | 3/2017 | Breen | G01S 7/032 |
| 2018/0017675 A1* | 1/2018 | Hong | G01S 13/589 |
| 2018/0059236 A1* | 3/2018 | Wodrich | G01S 13/867 |
| 2018/0182243 A1* | 6/2018 | Baba | G08G 1/166 |
| 2018/0278919 A1* | 9/2018 | Lee | H04N 13/243 |
| 2019/0235504 A1* | 8/2019 | Carter | G06T 7/73 |
| 2019/0256091 A1* | 8/2019 | Lepp | B60W 30/0956 |
| 2019/0339382 A1* | 11/2019 | Hess | H04B 7/0413 |
| 2019/0353774 A1* | 11/2019 | Chondro | G01S 17/86 |
| 2019/0377086 A1* | 12/2019 | Rogan | G01S 13/867 |
| 2020/0025575 A1* | 1/2020 | Weissman | G01S 17/06 |
| 2020/0298842 A1* | 9/2020 | Takamatsu | B60W 30/095 |

FOREIGN PATENT DOCUMENTS

| | | | | |
|---|---|---|---|---|
| CN | 108010360 A | * | 5/2018 | .......... G08G 1/0116 |
| CN | 108010360 A | | 5/2018 | |
| CN | 108182817 A | | 6/2018 | |
| JP | 2003302470 A | | 10/2003 | |
| JP | 2006085246 A | | 3/2006 | |
| JP | 2009199532 A | | 9/2009 | |
| JP | 2009201098 A | | 9/2009 | |
| JP | 2012531138 A | | 12/2012 | |
| JP | 2017000189 A | | 1/2017 | |

OTHER PUBLICATIONS

Extended European Search Report for EP Application No. 19191467.0, dated Feb. 14, 2020, 8 pages.
Office Action for Chinese Application No. 201811015653.1, dated Jul. 15, 2021, 8 pages.
Decision on Rejection for Japanese Application No. 2019-158725, dated Apr. 27, 2021, 3 pages.
Office Action for European Application No. 19191467.0, dated Oct. 29, 2021, 6 pages.

* cited by examiner

INTELLIGENT ROADSIDE UNIT

CROSS-REFERENCE TO RELATED APPLICATION

The present application is based upon and claims priority to Chinese Patent Application No. 201811015653.1, filed on Aug. 31, 2018, the entirety contents of which are incorporated herein by reference.

FIELD

The present disclosure relates to a technical field of intelligent transportation, and more particularly, to an intelligent roadside unit.

BACKGROUND

Currently, an intelligent roadside unit is an important support for autonomous driving. As requirements on intelligence level of the intelligent roadside unit increases, demands on the sensing capability of the intelligent roadside unit is becoming higher and higher, such that various sensing detectors need to be disposed on the intelligent roadside unit to improve the active sensing of the intelligent roadside unit. However, since the intelligent roadside unit needs to process a large amount of data, the reliability may be decreased due to the high temperature and heavy processing burden, causing a security risk in the navigation of the intelligent driving vehicle when a malfunction of the intelligent roadside unit occurs.

SUMMARY

The present disclosure aims at solving at least one of the technical problems in the related art to some extent.

To this end, an objective of the present disclosure is to provide an intelligent roadside unit.

To achieve the above objectives, embodiments of the present disclosure propose an intelligent roadside unit, including: a radar configured to detect an obstacle within a first preset range of the intelligent roadside unit; a camera configured to capture an image of a second preset range of the intelligent roadside unit; a master processor coupled to the radar and the camera, and configured to generate a point cloud image according to information on the obstacle detected by the radar and the image detected by the camera; and a slave processor coupled to the radar and the camera, and configured to generate a point cloud image according to the information on the obstacle detected by the radar and the image detected by the camera, wherein the slave processor checks the master processor, and when the master processor breaks down, it is switched from the master processor to the slave processor.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Figure 1:
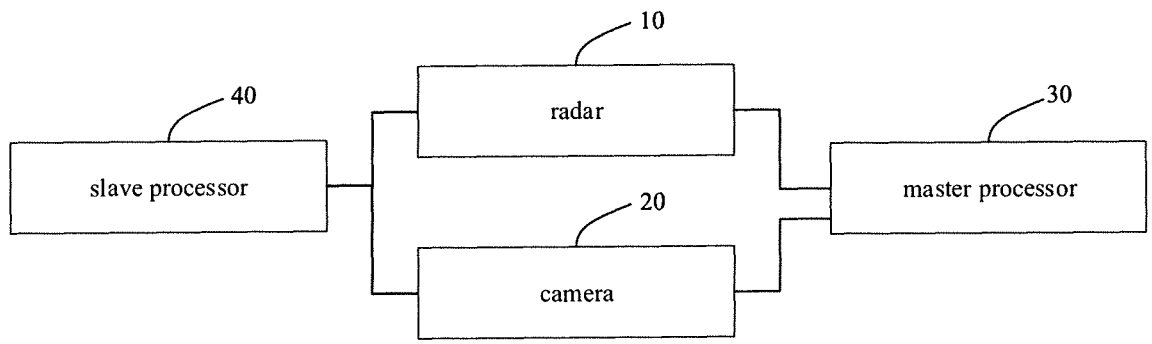
FIG. 1 is a structure schematic diagram of an intelligent roadside unit according to an embodiment of the present disclosure.

Embodiments of the present disclosure are described below in detail, examples of the embodiments are shown in accompanying drawings, and reference numerals that are the same or similar from beginning to end represent the same or similar components or components that have the same or similar functions. The embodiments described below with reference to the accompanying drawings are exemplary, are merely used to explain the present disclosure, and should not be construed as a limit to the present disclosure.

Hereinafter, the intelligent roadside unit according to embodiments of the present disclosure will be described with reference to the drawings.

The intelligent roadside unit provided by embodiments of the present disclosure may be applied to an automatic vehicle.

FIG. 1 is a structure schematic diagram of an intelligent roadside unit according to an embodiment of the present disclosure. As shown in FIG. 1, the intelligent roadside unit includes: a radar 10, a camera 20, a master processor 30 and a slave processor 40.

The radar 10 is configured to detect an obstacle within a first preset range of the intelligent roadside unit.

The camera 20 is configured to capture an image of a second preset range of the intelligent roadside unit.

The master processor 30 coupled to the radar 10 and the camera 20 is configured to generate a point cloud image according to information on the obstacle detected by the radar 10 and the image detected by the camera 20.

The slave processor 40 coupled to the radar 10 and the camera 20 is configured to generate a point cloud image according to the information on the obstacle detected by the radar 10 and the image detected by the camera 20. The slave processor 40 checks the master processor 30, and when the original master processor 30 breaks down, it is switched from the master processor to the slave processor.

Specifically, one or more radars 10 may be arranged according to practical application requirements to detect an obstacle within the first preset range of the intelligent roadside unit. The first preset range may be set according to practical application requirements.

In a possible implementation, the intelligent roadside unit according to embodiments of the present disclosure is applied to a vehicle A, and the radar 10 may detect an obstacle (for example, another vehicle, a pedestrian or a building that is less than one meter from the vehicle A) within a certain range from the vehicle A.

Figure 2:
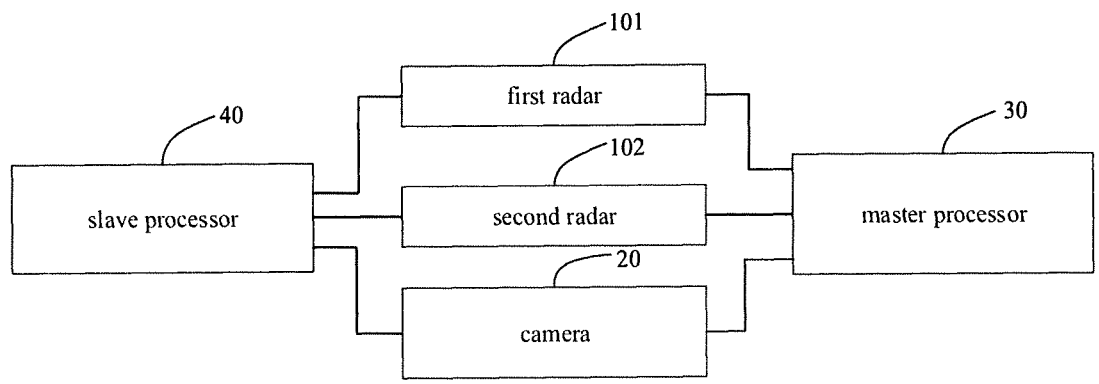
FIG. 2 is a structure schematic diagram of an intelligent roadside unit according to another embodiment of the present disclosure.

In a possible implementation, as shown in FIG. 2, the radar 10 includes: a first radar 101 and a second radar 102.

In practical applications, the first radar 101 is configured to detect a distant obstacle while the second radar 102 is configured to detect a nearby obstacle. A detection range of the first radar 101 may be arranged broader than a detection range of the second radar 102, thereby further improving the reliability of the radar on detecting an obstacle and lowering the costs of the intelligent roadside unit.

In a possible implementation, the intelligent roadside unit according to embodiments of the present disclosure is applied to the vehicle A. The second radar 102 detects an obstacle such as another vehicle, a pedestrian and a building of which the distance from the vehicle A is less than one meter; and the first radar 101 detects an obstacle such as another vehicle, a pedestrian and a building that is of which the distance from the vehicle A is greater than one meter but less than two meters.

It should be noted that the intelligent roadside unit according to embodiments of the present disclosure is applied to a field of automatic drive. The second radar 102 is mainly applied to blind zone detection (blind zone monitoring), lane keeping and lane changing assist, collision alarm or anti-collision protection of a rear radar, parking assist, traffic monitoring at an intersection and on the like.

It should be noted that the intelligent roadside unit according to embodiments of the present disclosure is applied to the field of automatic drive. The first radar 101 is applied to braking assist, autonomous distance control and on the like.

It should be noted that types of the first radar 101 and second radar 102 may be chosen according to practical application requirements to further improve the obstacle detection ability. Examples are illustrated as follows.

In a first example, the first radar 101 and the second radar 102 are both laser radars. A laser radar is mainly used for measuring a distance from a fixed or movable object.

The first radar 101 is a 64-channel laser radar, and the second radar 102 is a 16-channel laser radar.

As a second example, the first radar 101 is a laser radar, and the second radar 102 is a millimeter-wave radar. A millimeter-wave radar is the only sensor that works around the clock, and its accuracy of speed measurement and ranging is much higher than that of vision.

It should be noted that positions of the radar 10 and the camera 20 may be arranged according to practical application requirements. In a possible implementation, the first radar 101 may be arranged above the camera 20, and the second radar 102 may be arranged below the camera 20.

Specifically, one or more cameras 20 may be arranged according to practical application requirements to capture an image of the second preset range of the intelligent roadside unit. The second preset range may be set according to practical application requirements.

In a possible implementation, the intelligent roadside unit according to embodiments of the present disclosure is applied to the vehicle A, and the camera 20 may capture an image (for example, another vehicle, a pedestrian or an intersection indicator that is less than one meter from the vehicle A) of a certain range of the vehicle A.

As an example, the at least one camera 20 may be a plurality of cameras 20, i.e., the intelligent roadside unit may include a plurality of cameras 20. The plurality of cameras 20 correspond to intersections monitored by the intelligent roadside unit respectively. By setting cameras 20 at different positions and in different directions, the accuracy and reliability of the point cloud image may be further improved.

Specifically, both the master processor 30 and the slave processor 40 are coupled to the radar 10 and the camera 20. It may be switched from the master processor 30 to the slave processor 40 when the original master processor 30 breaks down, and the point cloud image may be generated according to the information on the obstacle detected by the radar 10 and the image detected by the camera 20.

The slave processor 40 may adopt a variety of methods to detect the master processor 30. In a possible implementation, the slave processor 40 is configured to send a heartbeat detection message to the master processor 30, and when the slave processor 40 does not receive a response message fed back by the master processor 30 within a preset period, it is determined that the master processor 30 breaks down. In another possible implementation, a breakdown detection sensor is arranged to check the master processor 30, and the breakdown detection sensor sends a check result to the slave processor 40, such that the slave processor 40 may check out whether the master processor 30 breaks down according to the check result.

With the intelligent roadside unit according to embodiments of the present disclosure, the radar is configured to detect an obstacle within a first preset range of the intelligent roadside unit; the camera is configured to capture an image of a second preset range of the intelligent roadside unit; the master processor is coupled to the radar and the camera, and is configured to generate a point cloud image according to information on the obstacle detected by the radar and the image detected by the camera; and the slave processor is coupled to the radar and the camera, and is configured to generate a point cloud image according to the information on the obstacle detected by the radar and the image detected by the camera. The slave processor checks the master processor, and when the original master processor breaks down, it is switched from the master processor to the slave processor. By setting a main processor and a secondary processor (i.e., a master processor and a slave processor, or a primary processor and a backup processor), it may be guaranteed that when one processor breaks down, the other processor may be switched on timely for subsequent processing, thereby improving the reliability of the intelligent roadside unit.

Figure 3:
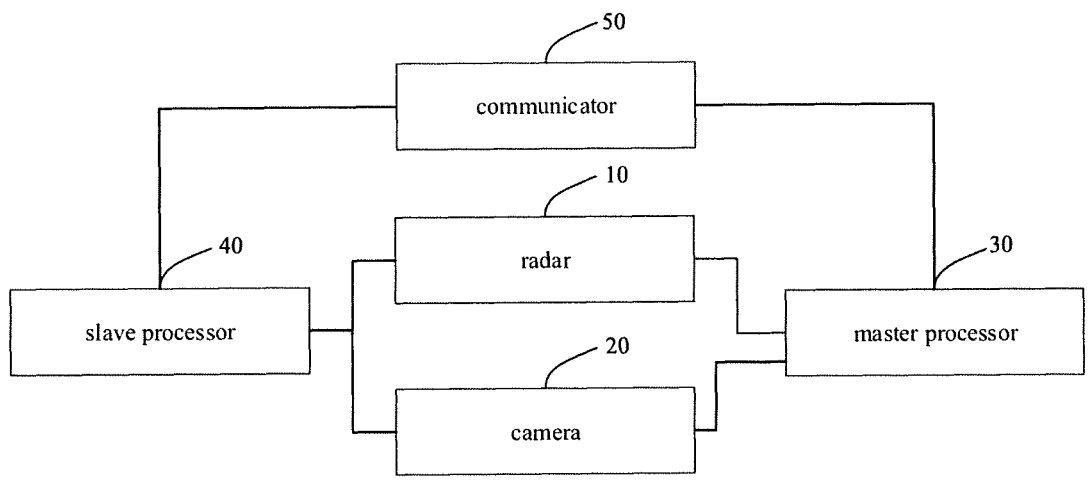
FIG. 3 is a structure schematic diagram of an intelligent roadside unit according to yet another embodiment of the present disclosure.

FIG. 3 is a structure schematic diagram of an intelligent roadside unit according to yet another embodiment of the present disclosure. As shown in FIG. 3, on the basis of FIG. 1, the intelligent roadside unit further includes: a communicator 50.

The communicator 50 is coupled to the master processor 30 and the slave processor 40. The currently active processor 30 is configured to send the point cloud image to the self-driving vehicle or the server close to the intelligent roadside unit through the communicator 50.

The communicator 50 may be an antenna or a wireless connection device.

Figure 4:
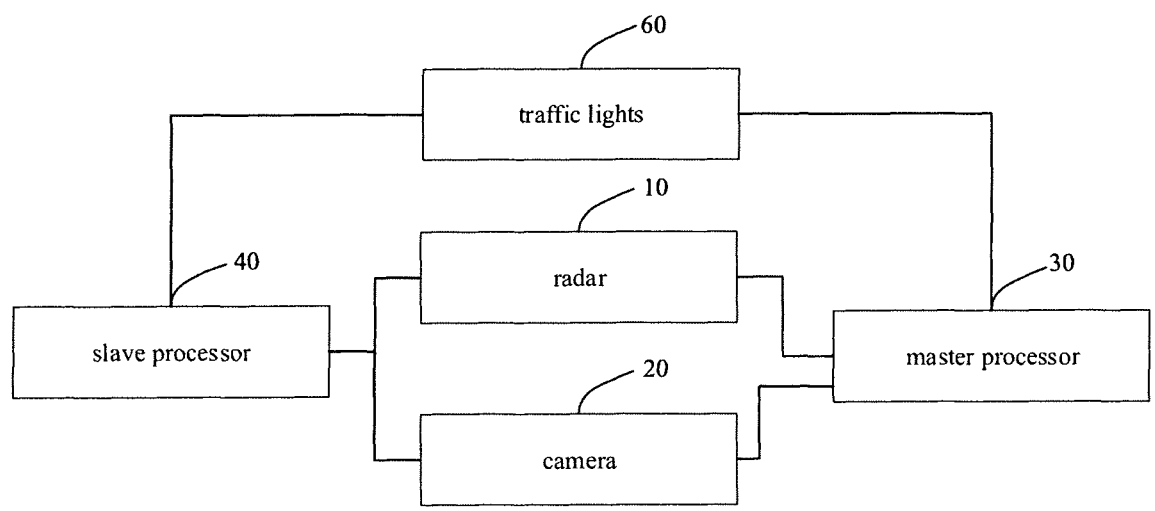
FIG. 4 is a structure schematic diagram of intelligent roadside unit according to still yet another embodiment of the present disclosure.

FIG. 4 is a structure schematic diagram of an intelligent roadside unit according to still yet another embodiment of the present disclosure. As shown in FIG. 4, on the basis of FIG. 1, the intelligent roadside unit further includes: traffic lights 60.

Specifically, the master processor 30 is configured to control the traffic lights 60 according to the point cloud image. Consequently, the applicability of the intelligent roadside unit is further improved.

In an embodiment of the present disclosure, the intelligent roadside unit further includes a shielding layer wrapping at least a part of the camera 20.

As a possible implementation, the shielding layer wraps the camera 20 excluding the lens and the heat dissipation portion.

Consequently, wrapping the camera 20 except for the lens and the heat dissipation portion with a shielding material may eliminate interferences caused by components such as the radar 10 and the antenna on the camera 20, thereby increasing an imaging clarity of the camera 20 and further improving the reliability of the intelligent roadside unit.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without contradictions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An intelligent roadside unit, comprising:
   a radar configured to detect an obstacle within a first preset range of the intelligent roadside unit;
   a camera configured to capture an image of a second preset range of the intelligent roadside unit;
   a master processor coupled to the radar and the camera, and configured to generate a point cloud image according to information on the obstacle detected by the radar and the image detected by the camera; and
   a slave processor coupled to the radar and the camera, and configured to generate the point cloud image according to the information on the obstacle detected by the radar and the image detected by the camera, wherein the slave processor checks the master processor, and when the master processor breaks down, it is switched from the master processor to the slave processor;
   wherein the slave processor is configured to send a heartbeat detection message to the master processor, and when the slave processor does not receive a response message fed back by the master processor within preset period, it is determined that the master processor breaks down,
   wherein the radar comprises a first radar and a second radar, a detection range of the first radar is broader than a detection range of the second radar, the first radar is arranged above the camera, and the second radar is arranged below the camera.

2. The intelligent roadside unit according to claim 1, further comprising:

a communicator coupled to the master processor and the slave processor, the currently active master processor being configured to send the point cloud image to a self-driving vehicle or a server around the intelligent roadside unit through the communicator.

3. The intelligent roadside unit according to claim 1, further comprising:
traffic lights, the currently active master processor being configured to control the traffic lights according to the point cloud image.

4. The intelligent roadside unit according to claim 1, further comprising: a shielding layer wrapping at least a part of the camera.

5. The intelligent roadside unit according to claim 1, wherein the first radar and the second radar are laser radars.

6. The intelligent roadside unit according to claim 5, wherein the first radar is a 64-channel laser radar, and the second radar is a 16-channel laser radar.

7. The intelligent roadside unit according to claim 1, wherein the first radar is a laser radar, and the second radar is a millimeter-wave radar.

8. The intelligent roadside unit according to claim 1, further comprising a plurality of cameras, wherein the plurality of cameras correspond to intersections monitored by the intelligent roadside unit correspondingly.

9. The intelligent roadside unit according to claim 4, wherein the shielding layer wraps the camera except for a lens and a heat dissipation portion.

* * * * *